United States Patent [19]

Wise et al.

[11] Patent Number: 4,955,711

[45] Date of Patent: Sep. 11, 1990

[54] CONTACT LENSES FOR ANIMALS

[75] Inventors: Randall E. Wise, Wellesley, Mass.; Alvah T. Leighton, Jr., Blacksburg, Va.

[73] Assignee: Animalens, Inc., Wellesley, Mass.

[21] Appl. No.: 126,551

[22] Filed: Nov. 30, 1987

[51] Int. Cl.$^5$ .................. G02C 7/04; A01K 37/00
[52] U.S. Cl. .................. 351/160 R; 119/97.1; 119/104
[58] Field of Search ............ 351/160 R, 160 H, 161, 351/162; 119/97 R, 104; D30/144

[56] References Cited

U.S. PATENT DOCUMENTS

| | | | |
|---|---|---|---|
| 2,181,070 | 11/1939 | Rudolph | 119/97 |
| 2,217,891 | 10/1940 | Cridlebaugh | 119/97 |
| 2,332,930 | 10/1943 | Rinia | 350/432 |
| 2,347,483 | 4/1944 | Lawlor et al. | 351/160 R |
| 2,437,436 | 3/1948 | Mullen | 351/177 |
| 2,438,743 | 3/1948 | Feinbloom | 351/160 R |
| 2,644,985 | 7/1953 | Crandon | 351/160 R |
| 3,187,338 | 6/1965 | Neefe | 351/160 R |
| 3,247,550 | 4/1966 | Haines, Jr. | 18/36 |
| 3,418,978 | 12/1968 | Wise et al. | 351/160 R |
| 3,900,250 | 8/1975 | Ivani | 351/160 R |
| 3,973,561 | 8/1976 | Kane | 351/160 H |
| 4,171,878 | 10/1979 | Kivaev et al. | 351/160 R |
| 4,199,231 | 4/1980 | Evans | 351/160 H |
| 4,257,988 | 3/1981 | Matos et al. | 264/1.1 |
| 4,459,246 | 7/1984 | Neefe | 264/2.1 |
| 4,521,375 | 6/1985 | Houlsby | 206/5.1 X |
| 4,560,342 | 12/1985 | Ishida et al. | 425/808 |
| 4,702,573 | 10/1987 | Morstad | 351/160 H |

FOREIGN PATENT DOCUMENTS

| | | |
|---|---|---|
| 1265077 | 12/1961 | France . |
| 2463425 | 2/1981 | France . |
| 1045065 | 10/1966 | United Kingdom . |
| 1273290 | 5/1972 | United Kingdom . |
| 1306857 | 2/1973 | United Kingdom . |
| 1579469 | 11/1980 | United Kingdom . |

OTHER PUBLICATIONS

Winget, *Poultry Science*, vol. 41, No. 1694, 1962.

"Contact Lenses for Chickens", *The Optician*, Oct. 25, 1963, p. 401.
"Contact Lenses for Turkeys", *The Optician*, Dec. 8, 1967, p. 575, vol. 154, No. 4001.
Beane, *Poultry Science*, vol. 65, Supplement 1 (1986), p. 11.
Leff, "Questions: Why Did the Chicken Wear Contact Lenses?", *The Wall Street Journal*, Dec. 16, 1980, pp. 1, 31.
"Contacts for Chickens", *Contact Lens Forum*, May 1980, pp. 21-27.

(List continued on next page.)

*Primary Examiner*—Scott J. Sugarman
*Attorney, Agent, or Firm*—Fish & Richardson

[57] ABSTRACT

A contact lens for an animal (such as an egg-laying hen) having a nictitating membrane. The contact lens has a curved central region adapted to be disposed over and spaced from the cornea when the contact lens is in place in the eye. The lens also includes a peripheral region, disposed about the central region and having a curvature opposite thereto (i.e., a "reverse curvature"), to fit snugly under the animal's outer eyelids to aid in retention. An annular surface portion of the peripheral region is adapted to contact and rest on an annular region of the eye tissue disposed radially outward of the region at which the nictitating membrane joins the eye tissue. The radius of curvature of the central region provides, along with the increased diameter of the outer annular surface portion, a chamber within which the nictitating membrane may move under the lens without interference from the lens. The slope of the curvature of the interior surface of the central region is continuous with the slope of the curvature of the interior surface of the peripheral region at the junction between the central and peripheral regions. A portion of the central region has a thickness greater than that of the peripheral region without forming any discontinuities in the exterior surface of the lens. The contact lens is also extremely thin. An injection molding process for fabricating the contact lens is additionally provided.

31 Claims, 3 Drawing Sheets

OTHER PUBLICATIONS

Bonnet, "A Method for the Construction and Use of Contact Occluders for Small Animals", *Physiology & Behavior*, vol. 10, 1973, pp. 623–625.

Arbi, "Effects of Vision–Restricting Polypeepers on the Behavior of Laying Hens During Adaptation, Feeding, on General Activity, Agonistic Behaviour and Pecking Damage", *British Poultry Science*, Jul. 1983, vol. 24, No. 3, pp. 371–381.

Toline, "Contact Lenses Fitted to the Eyes of Fish", *American Journal of Optometry and Archives of American Academy of Optometry*, 1963, pp. 140–142, vol. 40.

"'Monkeying' Around with Contacts", *Contact Lens Forum*, Sep. 1981, pp. 23≧25.

"Veterinary Applications of Soft Lenses", *Contact Lens Forum*, Nov. 1981, pp. 21–23.

Ling, "Tinted Contact Lenses for Treatment of Retinal Degeneration in a Greyhound", *Journal of the American Veterinary Medical Assoc.*, Jan. 1986, vol. 188, No. 1.

Gammon, "Extended-Wear Soft Contact Lenses for Vision Studies in Monkeys", *Investigative Ophthalmology and Visual Science*, Nov. 1985, pp. 1636–1639, vol. 26, No. 11.

Katz, "Complications of Contact Lens Wear After Radial Keratotomy in an Animal Model", *American Journal of Ophthalmology*, Sep. 1982, pp. 377–382, vol. 94, No. 3.

Tammeus, "Therapeutic Extended Wear Contact Lens for Corneal Injury in a Horse", *Journal of the American Veterinary Medical Assoc.*, Feb. 1983, vol. 182, No. 3.

Spielman, "Development of a Contact Lens for Refracting Aquatic Animals", *Ophthamology Physiol. Opt.*, 1983, vol. 3, No. 3, pp. 255–260.

Spielman, *Supplement to Investigative Ophthamology and Visual Science*, Apr. 1980, p. 211.

Guld, "Contact Lenses for Animals Used in Vision Research", *Vision Research*, 1975, vol. 15.

CONTACT LENSES FOR ANIMALS

Background of the Invention

The present invention relates to contact lenses for animals, for example fowl, and methods of fabricating such lenses.

As is well known, fowl, such as domestic hens raised for egg production, are naturally combative. Hens typically attack one another with their beaks to establish a "pecking order" within the flock. This pecking behavior is aggravated by the sight of blood, and a chicken will concentrate its pecking on visibly bloodied areas of another bird. Left unchecked, this pecking behavior results in reduced egg production and an unacceptably high death rate within domestic egg-laying hen flocks.

One prior method of addressing chickens' pecking behavior, described in U.S. Pat. No. 3,418,978, issued to I. Wise et al. on Dec. 31, 1968, is to insert vision-distorting contact lenses in the eyes of birds. The central portion of the lens is spaced from the animal's cornea to provide a chamber between the lens and cornea for the nictitating membrane (i.e. inner eyelid). The thickness and curvature of the central portion produce some vision distortion. The outer portion of the lens, which bears on the eye, has a curvature which generally conforms to the contour of the eye. A curvature discontinuity or "break" exists on the interior and exterior surfaces of the lens at the junction between the central and outer lens portions. The lens is formed by injecting, for example, a thermoplastic resin into a mold at a surface corresponding to the exterior surface of the central portion of the lens and a depression is intentionally formed during molding in the center of the exterior surface to produce added vision distortion. The distortion of the hen's vision reduces the bird's tendency to peck other hens. Additionally, the lens may be tinted red to produce red vision at all times, thus rendering the bird incapable of discerning red blood and thereby reducing pecking.

While such contact lens and fabrication method may be satisfactory in some applications, the lens tends to irritate the eyes, resulting in corneal damage (e.g. ulceration) and attempts by the animal to remove it. Thus, the lens typically may not be retained in the eye for any appreciable amount of time. That is, the lens "retention factor" may not be as high as is desirable in some applications.

Summary of the Invention

In general, the invention features, in a first aspect, a contact lens for an eye of an animal having a nictitating membrane, the contact lens comprising a curved central region and a peripheral region having a curvature opposite thereto. The opposite (or reverse) curvature of the peripheral region provides a tangential interface between the bearing surface of the contact lens and the eye (specifically, the sclera), thereby allowing the peripheral region of the contact lens to fit snugly beneath the outer eyelids of the animal, thereby impeding the contact lens from sliding out of the eye and thus aiding in the retention of the contact lens in the eye for extended periods of time. Also, the area of the bearing surface is increased over that which would occur if the curvature of the central region was carried through the peripheral region, further aiding the retention of the contact lens in the eye.

Preferred embodiments include the following features. The contact lens is adapted for the eye of an egg-laying hen and has an edge diameter between 13.0 millimeters and 15.3 millimeters. The inner diameter of the annular portion is 1 millimeter less than the edge diameter. The contact lens is tinted to filter out light having wavelengths other than in the band from 5300 to 6800 Angstroms, and specifically is tinted red. The contact lens comprises a hydrophobic material having a relatively low wetting angle. A suitable lens material is polymethyl methacrylate. However, other materials, such as gas permeable materials (including silicone, a combination of polymethyl methacrylate and silicone, and cellulose acetate butyrate), may also be used.

In a second aspect, the invention features a peripheral region having an annular surface portion adapted to contact the eye tissue radially outwardly of the fully retracted nictitating membrane when the contact lens is in place in the eye. Thus, the contact lens permits the nictitating membrane to completely retract without restriction from the contact lens, thereby substantially reducing eye irritation and permitting the contact lens to be maintained in the eye for extended periods of time. Also, damage to the eye (such as corneal degeneration) is avoided because the contact lens rests on the eye radially outwardly of the cornea.

Preferred embodiments include the following features. The lens includes a central region bounded by the peripheral region and adapted to be disposed over and spaced from the cornea when in place. The radius of curvature of the central region is selected to form a chamber between the central region and a surface of the eye within which the nictitating membrane may move without interference from the contact lens. The contact lens includes an interior surface having a transition between the curvature of the central region and the opposite curvature which is substantially smooth and free of discontinuities in the slopes of the curvatures. For the eye of an egg-laying hen, the radius of the curvature of the central region is between 7.0 millimeters and 8.5 millimeters, and the radius of the reverse curvature is between 1.3 millimeters and 1.9 millimeters. The curvature transition is disposed radially outwardly from a center of the contact lens a distance selected to dispose the transition over the fully retracted nictitating membrane. The radius of the curvature of the central region defines an angle of between about 33° and about 39° at the transition with a line drawn through an origin of the radius of curvature parallel to a diameter of the contact lens.

In a third aspect, the invention features a contact lens comprising a curved central region and a peripheral region disposed about the central region and having a curvature opposite thereto, with the peripheral region having an annular surface which contacts the eye tissue radially outwardly of a region on the eye at which the nictitating membrane joins the eye tissue, and the contact lens having a maximum thickness of 0.5 millimeters.

In a fourth aspect, the invention features providing the central and peripheral regions with curved interior surfaces, with the slope of the curvature of the interior surface of the central region being continuous with the slope of the curvature of the interior surface of the peripheral region at the junction between the central and peripheral regions. The uniformly smooth curvature of the interior surface further enhances the freedom with which the nictitating membrane may move under the contact lens, because there is no corner or "break"

on the interior surface to catch and irritate the nictitating membrane as it moves. The nictitating membrane, being free to move over the cornea, efficiently cleans the corneal surface, thereby minimizing mucus buildup on the interior surface of the contact lens.

In a fifth aspect, the invention features providing at least a portion of the central region with a thickness greater than that of the peripheral region, with no curvature discontinuities existing on the exterior surface of the contact lens. Thus, no place (such as a corner or crevice) is provided within which mucus may accumulate and irritate the eye.

Preferred embodiments for use with egg-laying hens include the following features. The thickness of the peripheral region is between approximately 0.08 millimeters and 0.32 millimeters, and is preferably 0.16 millimeters. The maximum thickness of the central region is 0.5 millimeters. The thickness of the portion of the central region through which the animal sees varies in an amount selected to minimize vision distortion. Contact lens-induced vision distortion is unnecessary to reduce a chicken's propensity for pecking by an acceptable amount. Rather, satisfactory reduction in the undesired pecking behavior may be achieved with non distorting, tinted (for example, red-tinted) contact lenses.

In a sixth aspect, the invention features a contact lens for the eye of an animal having a nictitating membrane, the contact lens having a central region through which the animal sees and a peripheral region disposed about the central region and bearing on the eye tissue, the peripheral region having a maximum thickness less than 0.19 mm. The probability of eye irritation increases as the thickness of the contact lens increases. A relatively thick contact lens does not allow the outer eyelids to freely move over the exterior surface of the lens, permitting mucus to accumulate on the lens. The extreme thinness of the contact lens of the invention makes the lens quite pliable and hence comfortable on the eye. The contact lens also has an exterior surface which is relatively close to the eye and closely resembles the contour of the eye. Thus, the outer eyelids may freely move over and clean the exterior surface of the contact lens, inhibiting mucus build-up and thereby reducing eye irritation.

In a seventh aspect, the invention features a method of fabricating a contact lens comprising the steps of providing a mold having a cavity therein bounded by a first surface corresponding to an interior surface of the contact lens and a second surface corresponding to an exterior surface of the contact lens, injecting material for the lens into the cavity through a gate disposed in the first surface, and curing the lens material to form the contact lens in the cavity. Because injection is made from the underside (i.e. at the interior surface) of the contact lens rather than from above the lens (i.e. via the exterior surface of the lens), the gate discontinuity caused by the injection of the lens material is disposed on the interior surface of the lens, spaced from the surface of the eye, and thus does not present a source of irritation to the eye or the nictitating membrane. Similar discontinuities, if disposed on the exterior surface, would irritate the outer eyelid as it moves over the contact lens.

In a preferred embodiment, the location of the gate corresponds to a point on the interior surface outside of the portion of the contact lens through which vision occurs. Thus, the gate discontinuity produces no vision distortion.

Other features and advantages of the invention will be apparent from the following description of the preferred embodiment, and from the claims.

Description of the Preferred Embodiment

Figure 1:
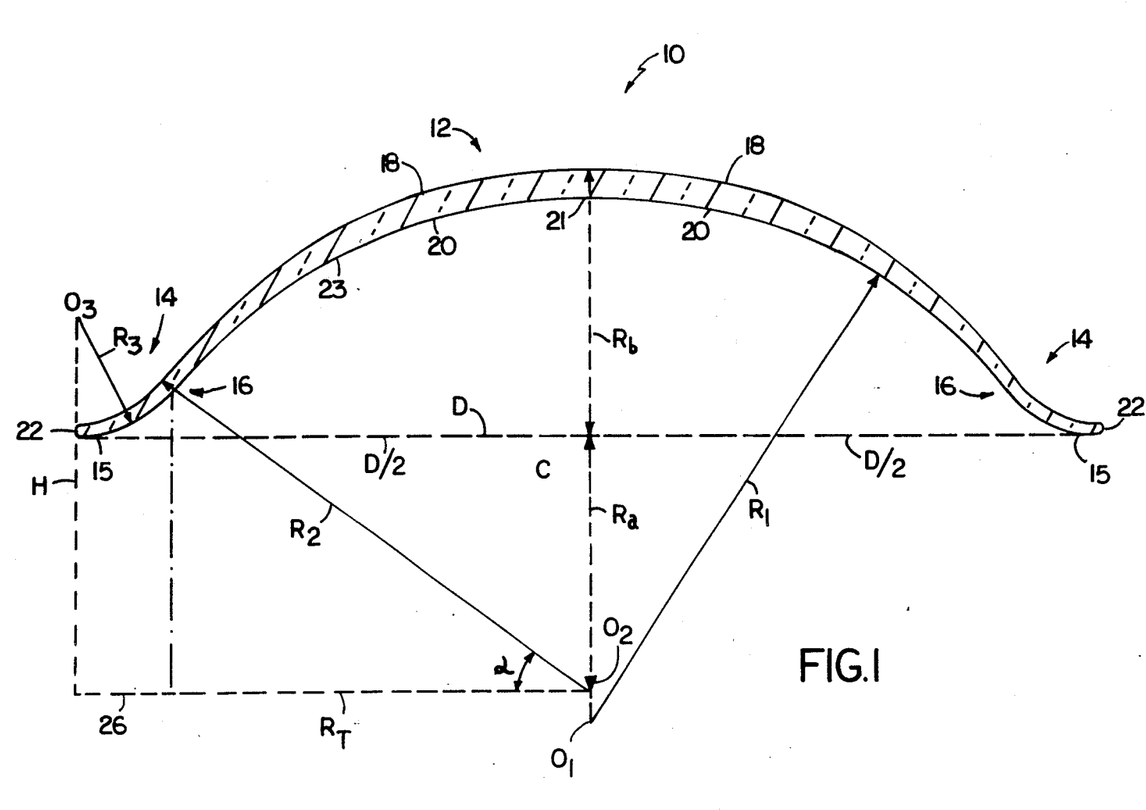
FIG. 1 is a cross-sectional view of an animal contact lens according to the present invention.

Referring to FIG. 1, a contact lens 10 for use in several species of animals, such as fowl (e.g. chickens, and specifically egg-laying hens), dogs, horses, pigs, cattle, sheep, and others, is shown. Contact lens 10 is generally circular in shape when viewed from above or below and comprises central region 12 and peripheral or edge region 14. As discussed in detail below, the curvature of peripheral region 14 is opposite to the curvature of central region 12; that is, peripheral region 14 has a "reverse curvature" with respect to central region 12. Central and peripheral regions 12, 14 meet along an annular transition region 16.

Contact lens 10 comprises a commercially available hydrophobic plastic material, here L-40 PMMA (polymethyl methacrylate), available from Cyro Industries of Woodcliff Lake, N.J. A hydrophobic, rather than hydrophilic, material is used to avoid a tight fit between lens 10 and the cornea of the eye caused by the tendency of hydrophilic material to absorb eye fluid. The material should have a "wetting angle" which is as low as possible so (such as between 8° and 16°) that an even film of eye fluid will form on the surfaces of lens 10 when the lens is in place in the eye. This helps supply oxygen to the cornea.

Contact lens 10 is tinted a selected color or colors to affect the behavior of the animal in a selected way, as is discussed in detail below. For example, when used to reduce the pecking behavior of egg-laying hens, lens 10 is tinted between green and dark red (e.g. to filter out light having wavelengths other than in the band between about 5300 and 6800 Angstroms) to reduce the hens' affinity for blood.

Contact lens 10 has an exterior surface 18 and an interior surface 20, which meet at a rounded edge 22. Surfaces 18, 20 are substantially smooth and free of any discontinuities (such as "breaks" in curvature or depressions). The thickness of peripheral region 14 is substantially constant. However, the thickness of lens 10 gradually increases between transition region 16 and the radial center 21 of lens 10 for purposes to be discussed. The change in thickness is sufficiently gradual in those portions of lens 10 that overlay the pupil of the eye that contact lens 10 introduces substantially no vision distortion.

Referring to the dimensions identified in FIG. 1, it is noted at the outset that the specific dimensional values discussed here apply to use of contact lens 10 with chickens, preferably with egg-laying hens, and specifically with White Leghorn egg-laying hens. Of course, the required dimensions of lens 10 will be different for different kinds of animals having larger or smaller eye dimensions, and will even vary among White Leghorns. The overall diameter, D, of lens 10, measured between edges 22, is selected so that contact lens 10, when in place in the eye, contacts the eye tissue at an annular region 15 on interior surface 20 disposed radially outward from the region on the eye where the nictitating membrane joins the sclera. Diameter D is between about 13.0 and 15.3 millimeters (mm) for egg-laying hens, and preferably between 14.1 mm and 14.4 mm, and most preferably 14.3 mm, for White Leghorns. The inner diameter of annular region 15 is about 1.0 mm less than diameter D, leaving approximately a ½ mm lip adjacent edge 22 to bear on the eye tissue. Thus, the inner diameter of annular region 15 is about 13.3 mm for White Leghorn egg-laying hens. Lens 10 is radially symmetrical about a center point C; thus diameter D comprises a pair of equal edge radii, D/2, of 7.15 mm.

Peripheral region 14 has a constant thickness between 0.08 mm and 0.32 mm for egg-laying hens, preferably between 0.12 mm and 0.20 mm for White Leghorns, and most preferably 0.16 mm. Beginning at transition region 16, the thickness of lens 10 in central region 12 gradually increases to a maximum at the radial center 21 of lens 10. Such increase in thickness is made to allow lens 10 to be fabricated by injection molding with the mold being filled uniformly by the injected lens material, as will be explained. The thickness at center point 21 is preferably between 0.254 mm and 0.42 mm for White Leghorns, and is most preferably 0.381 mm. In any event, the thickness at center 21 should be no greater than 0.5 mm to avoid supporting exterior surface 18 so far from the surface of the eye as to interfere with the movement of the outer eyelids over lens 10. If lens 10 is fabricated by another method (such as by grinding), the lens thickness need not be increased at all in central region 12. The injection molding point or gate 23 is located at a radius from center 21 greater than the radius of the fully dilated pupil of the eye. Gate 23 is radially disposed 3.5 mm from lens center 21. The thickness of lens 10 at gate 23 is most preferably 0.25 mm.

The curvature of interior surface 20 in central region 12 is defined by a radius, $R_1$, denoted as the interior "sag radius", measured from an origin, $O_1$. Interior sag radius $R_1$ is selected to be sufficiently large to maintain interior surface 20 in central region 12 spaced from the nictitating membrane when the membrane is either extended (i.e. closed) or fully retracted (i.e. open). Interior sag radius $R_1$ is between 7.0 mm and 8.5 mm for egg-laying hens and is preferably between 7.2 mm and 7.6 mm, most preferably 7.531 mm, for White Leghorns.

The sag radius $R_2$ of exterior surface 18 in central region 12 is measured from origin $O_2$ and is between 7.0 mm and 8.5 mm for egg-laying hens. Radius $R_2$ is preferably between 7.2 mm and 7.6 mm for White Leghorns, most preferably 7.341 mm. Exterior sag radius $R_2$ may be viewed as comprising two components $R_a$, $R_b$. Component $R_a$ denotes the distance between origin $O_2$ and center point C, and is 3.547 mm for White Leghorn egg-laying hens. Component $R_b$ is measured between center point C and exterior surface 18, and for White Leghorn egg-laying hens is 3.794 mm. Center point C defines a point located at substantially the center of the eyeball when contact lens 10 is in place in the eye. Thus, component $R_b$ is selected to be slightly larger than the distance from the center C of the eyeball to lens surface 20 (taking the thickness of contact lens 10 at center 21 into account), here to provide a minimum spacing of between 0.25 mm and 0.30 mm between the cornea and interior lens surface 20 at center 21. Thus, origins $O_1$, $O_2$ are spaced by 0.571 mm for a thickness of 0.381 mm at lens center 21.

As discussed, reverse curved peripheral region 14 has a curvature opposite to the curvature of central region 12. That is, peripheral region 14 curves away from the curvature of central region 12, commencing at transition region 16. When contact lens 10 is in place in the eye, the nictitating membrane, when retracted, lies between the eye tissue and interior surface 20 below transition region 16. Thus, the radius, $R_T$, of transition region 16 from center 21 is determined in the general case by the thickness of the nictitating membrane and the radial location of the retracted nictitating membrane with respect to the center C of the eye. At transition region 16, the exterior sag radius $R_2$ makes an angle, α, with respect to a reference line 26 drawn through origin $O_2$ parallel to lens diameter D. Such angle is preferably between 33°50′ and 39°1′ for egg-laying hens, and specifically between 35°30′ and 36°54′, most preferably 36°7′, for White Leghorns. A radius of 36°7′ provides a radius $R_T$ of approximately 5.8 mm (taking the 0.16 mm thickness of contact lens 10 at transition region 16 into account). Peripheral region 14 has a radius of curvature, $R_3$ (measured from origin $O_3$ to interior surface 20), between 1.3 mm and 1.9 mm for egg-laying hens, and preferably between 1.5 mm and 1.7 mm, most preferably 1.67 mm, for White Leghorns. It is noted that origin $O_3$ is located a perpendicular distance, H (5.217 mm), from reference line 26.

Figure 2:
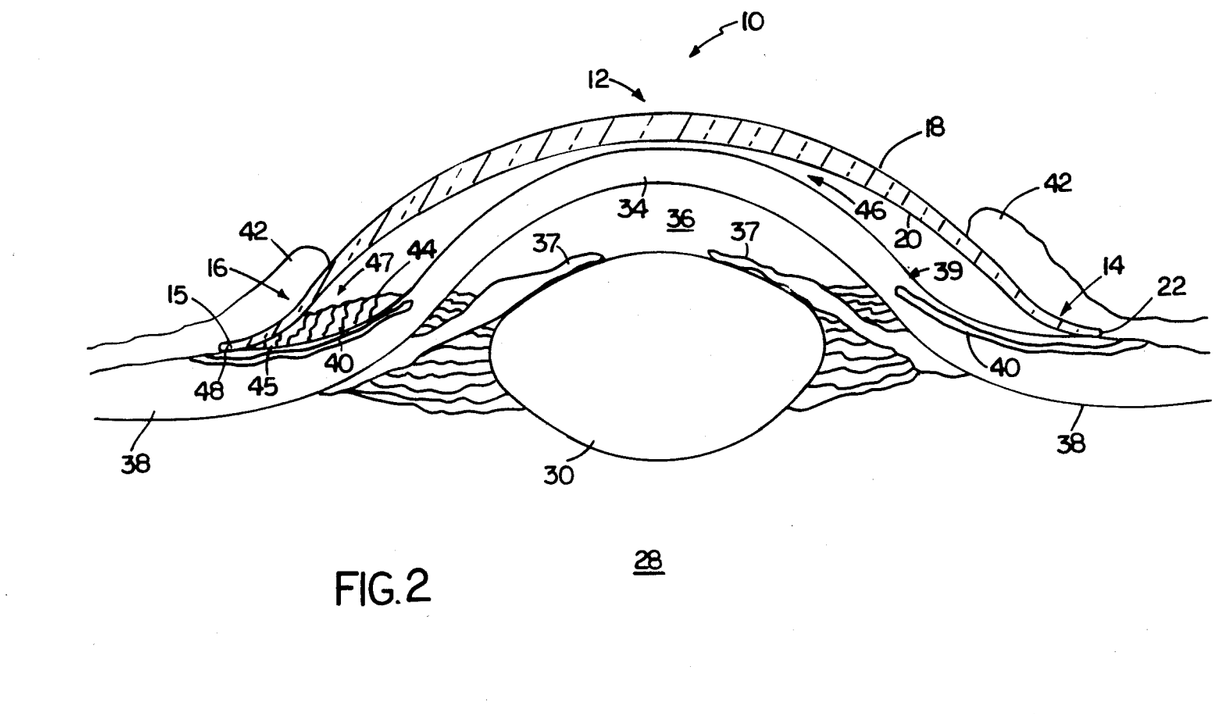
FIG. 2 is a transverse sectional view of the animal contact lens of FIG. 1 in place in the eye.

Referring to FIG. 2, contact lens 10 is shown in place on an eye 28 of a White Leghorn egg-laying hen. The process for inserting lens 10 into eye 28 is well known and will not be described here. The procedure may be performed entirely by hand or with the aid of, for example, a vacuum applicator.

The cornea 34 of eye 28 is separated from lens 30 by interior region 36. Iris 37 defines the pupil of eye 28. Scleral ring 40 begins at the junction 39 between cornea 34 and sclera 38 and extends radially outwardly from junction 39. The typical diameter of the cornea of an egg-laying hen is about 8.2 mm. The eye also includes outer eyelid 42 and nictitating membrane 44 (shown fully retracted in FIG. 2). Nictitating membrane 44 joins scleral tissue 38 at a region 45 on the nasal side of the sclera at scleral ring 40.

With contact lens 10 in place on eye 28, a chamber 46 is disposed between the surface of cornea 34 and the interior surface 20 of contact lens 10. Chamber 46 has a minimum depth, occurring at contact lens center 21, of 0.25 mm to 0.30 mm, and the curvature of interior surface 20 maintains the depth of chamber 46 substantially constant in the portion of central region 12 through which the hen sees (as defined by iris 37). The maximum depth of chamber 46 occurs at approximately the corneal-scleral junction 39, and is between approximately 0.95 mm and 1.0 mm. Of course, the exact depth of chamber 46 will vary from hen to hen. The typical thickness of an egg-laying hen's nictitating membrane 44 when fully retracted is only about 0.50 mm; membrane 44 is thinner still (typically between 0.10 mm and 0.15 mm thick) when fully extended over cornea 34 and scleral ring 40 (i.e. when closed). The depth of chamber 46 may be increased (by increasing sag radii $R_1$, $R_2$), but, if made too large, outer eyelids 42 may be unable to freely open and close over exterior surface 18.

Contact lens 10 rests on an annular region 48 of eye 28 disposed radially outwardly from the region 45 in which nictitating membrane 44 joins sclera 38; that is, contact lens 10 does not bear on nictitating membrane 44 or portions of cornea 34. Specifically, annular region 15 of lens surface 20 bears on annular region 48 of the scleral tissue 38 radially outside of retracted nictitating membrane 44 at the edge of eye 28 immediately under outer eyelids 42. In egg-laying hens, the center of the fully retracted nictitating membrane 44 is typically disposed between 6.1 mm and 6.2 mm from the center C of eye 28. Thus, the inner radius of annular region 15 from center C (6.65 mm) provides ample room for nictitating membrane 44 to retract. The reverse curvature shape of peripheral region 14 provides a tangential interface between annular region 15 of interior surface 20 and annular region 48 of eye 28. This allows edge 22 to fit snugly under outer eyelids 42 to reduce the possibility of contact lens 10 sliding out of eye 28. Also, the area of the lens which bears on the eye tissue is increased over that which would be obtained by maintaining the central region curvature all the way to edge 22, further aiding retention.

The curvature of interior surface 20 and large inner diameter of annular lens region 15 provide a peripheral chamber 47 within which nictitating membrane 44 retracts without interference from the contact lens. That is, as nictitating membrane 44 is retracted, sufficient space 47 (slightly greater than 0.50 mm) is provided between the eye tissue and the interior surface 20 of lens 10 for nictitating membrane 44 to move freely and without restriction from contact lens 10. While there may be some contact between the fully retracted nictitating membrane 44 and interior surface 20 at or near the region 45 where nictitating membrane 44 joins sclera 38, such contact does not impede the movement of nictitating membrane 44 because the lens rests on (i.e. is supported by) scleral tissue rather than on nictitating membrane 44.

The curvatures of surfaces 18, 20 are uniformly smooth over the entire contact lens. Thus, there are no discontinuities or "breaks" in the curvatures of interior surface 20 and exterior surface 18. Although the curvature direction of surfaces 18, 20 changes in transition region 16, such directional change occurs smoothly rather than as a corner or "break". Alternately stated, there are no discontinuities in the slopes of the curvatures of surfaces 18, 20.

In the region of contact lens 10 through which the animal sees (i.e., the region of lens 10 disposed radially inwardly of gate 23), the thickness of the lens varies slightly (from 0.25 mm to 0.381 mm). This small thickness change produces substantially no distortion (e.g. blurring) in the vision of eye 28. It is, of course, possible to alter the curvature of surfaces 18 or 20 to improve an animal's vision, if such is desired in a given application.

Figure 3:
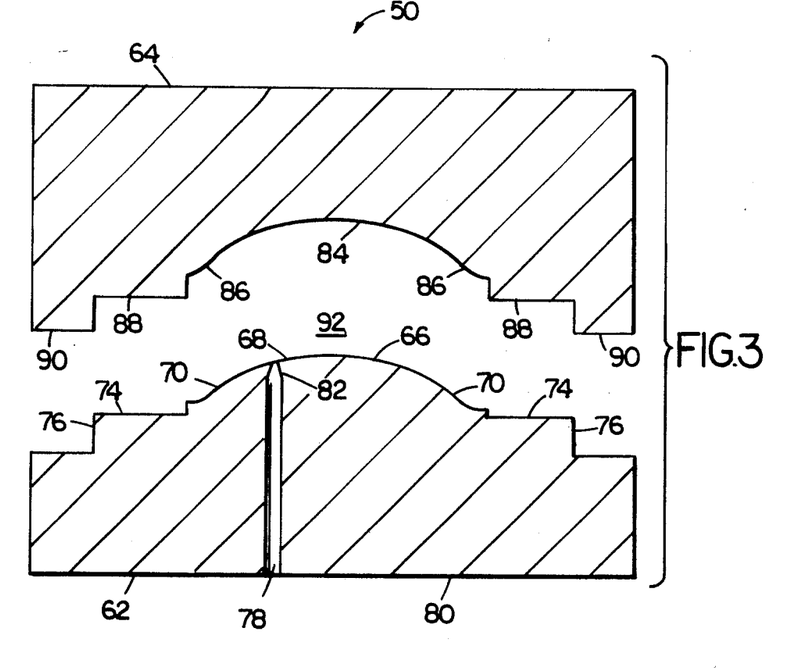
FIG. 3 is a cross-sectional view of an injection molding apparatus for fabricating the animal contact lens of FIG. 1.

Referring to FIGS. 1 and 3, a process for fabricating contact lens 10 by injection molding in molding unit 60 will now be discussed. Molding unit 60 comprises sections 62, 64 fabricated from steel. Molding unit 60 may be constructed to allow simultaneous injection molding of several contact lenses 10, for example a dozen or more lenses.

Section 62 includes a curved surface portion 66 conforming to interior surface 20 of lens 10. Thus, surface 66 includes central surface portion 68 and peripheral surface portion 70, corresponding to the curvatures of the interior surface of the lens in central and peripheral regions 12, 14, respectively. Section 62 also includes a pair of annular recesses 74, 76 for receiving section 64 thereon.

Section 62 has an injection passage 78 disposed therethrough from bottom surface 80. Passage 78 terminates in a narrow injection tube 82 which intersects surface 66. Tube 82 is aligned to inject the lens material (here PMMA) into central region 12 of lens 10 at gate 23 (FIG. 1). The region of lens 10 into which the lens material is injected should have a thickness greater than the remainder of the lens to allow the mold to be filled uniformly; hence the greater thickness of central region 12.

Section 64 includes a curved surface 84 having a curvature corresponding to that of exterior lens surface 18. A portion 86 of surface 84 is provided with a reverse curvature to match the curvature of exterior surface 18 in peripheral region 14. Section 64 includes a pair of annular protrusions 88, 90 for engaging recesses 74, 76 respectively of section 62, when mold 60 is closed.

In operation, the molding process is performed with mold sections 62, 64 disposed on their sides (i.e. with passage 78 disposed horizontally) to provide more thorough and efficient injection. When mold 60 is closed, a cavity 92 is disposed between curved mold surfaces 66, 84 corresponding to the shape and thickness selected for contact lens 10. The lens material (here formed by mixing PMMA powder with a granular color additive and heating the mixture to liquid form) is injected horizontally through injection tube 82. Air is vented from cavity 92 by a number of grooves (not numbered) radially disposed in surfaces 88, 90. A small area of roughness is formed on interior surface 20 at gate 23 due to the injection of lens material. After cavity 92 has been filled with the lens material and the material has solidified (i.e., cured), mold sections 62, 64 are separated.

Other Embodiments

The lens material may comprise several other compositions (approved by the FDA for contact lenses), such as a gas-permeable PMMA-silicone combination, silicone, or CAB (cellulose acetate butyrate).

Also, the color of contact lens 10 may be changed if lens 10 is to be used with different animals (for example, horses, dogs, pigs, cattle, sheep, etc.) or in applications other than reducing aggressive behavior. For example, contact lens 10 may be tinted a selected color to decrease an animal's sensitivity to certain wavelengths of ambient light. Also, tinted contact lenses may be employed to alter other behavior characteristics of chickens, for example, reproduction or "feed conversion ratio" (that is, the ratio between the amount of feed consumed per unit of weight gain or per egg produced), in place of exposing the chickens to colored ambient light. Thus, farm workers tending to the chickens can work comfortably under normal lighting and birds with contact lenses tinted various colors may be kept in the same area.

What is claimed is:

1. A contact lens for an eye of an animal having a nictitating membrane, said contact lens comprising
   a curved central region adapted to be spaced from the eye tissue to provide a chamber for said nictitating membrane, and
   a peripheral region having a curvature opposite to that of said curved central region, said peripheral region contacting and supporting the contact lens on the eye tissue.

2. The contact lens of claim 1 wherein said opposite curvature is selected to dispose an outer edge of said peripheral region beneath the outer eyelid when the contact lens is in place in the eye to assist in retaining the contact lens in the eye.

3. The contact lens of claim 1 wherein said contact lens comprises an interior surface disposed facing the eye when the contact lens is in place in the eye, an annular portion of said interior surface in the peripheral region of the lens being adapted to contact and rest on the eye tissue at an annular region on the eye disposed radially outward of said region of the eye at which the nictitating membrane joins the eye tissue.

4. The contact lens of claim 3 wherein an interior surface of the central region is adapted to be spaced from the eye tissue, when the contact lens is in place in the eye, by an amount sufficient to allow the nictitating membrane to move beneath said contact lens without interference from said interior surface of said central region.

5. The contact lens of claim 3 wherein said contact lens is adapted for the eye of an egg-laying hen, said contact lens having an edge diameter between 13.0 millimeters and 15.3 millimeters.

6. The contact lens of claim 5 wherein the inner diameter of said annular portion is 1 millimeter less than said edge diameter.

7. The contact lens of claim 1 wherein said contact lens is tinted to filter out light having wavelengths other than in the band from 5300 Angstroms to 6800 Anqstroms.

8. The contact lens of claim 7 wherein said contact lens is tinted red.

9. The contact lens of claim 1 wherein said contact lens comprises a hydrophobic material having a relatively low wetting angle.

10. The contact lens of claim 1 wherein said contact lens comprises polymethyl methacrylate.

11. The contact lens of claim 1 wherein said contact lens comprises silicone.

12. The contact lens of claim 1 wherein said contact lens comprises a combination of polymethyl methacrylate and silicone.

13. The contact lens of claim 1 wherein said contact lens comprises cellulose acetate butyrate.

14. The contact lens of claim 1 wherein said contact lens comprises a gas permeable material.

15. A contact lens for an eye of an animal that has a nictitating membrane having a portion that moves from a retracted position at the periphery of the eye to an extended position over the center of the eye, said contact lens comprising:
  a central region adapted to be spaced from the center of the eye so that the nictitating membrane can move beneath the central region, and
  a peripheral region having an annular surface portion adapted to contact the eye tissue, said annular surface portion being substantially out of contact with that portion of the nictitating membrane that moves from the retracted position to the extended position.

16. The contact lens of claim 15 wherein said central region is curved and is bounded by said peripheral region and adapted to be disposed over and spaced from the cornea of the eye when the contact lens is in place in the eye, said peripheral region having a curvature opposite thereto.

17. The contact lens of claim 16 wherein the radius of curvature of the central region is selected to form, when the contact lens is in place in the eye, a chamber between said central region and a surface of the eye within which the nictitating membrane may move without interference from said contact lens.

18. The contact lens of claim 16 wherein said contact lens comprises an interior surface having a transition between said curvature of said central region and said opposite curvature which is substantially smooth and free of discontinuities in slopes of said curvatures.

19. The contact lens of claim 16 wherein said contact lens is adapted for the eye of an egg-laying hen, the radius of said curvature of said central region being between 7.0 millimeters and 8.5 millimeters.

20. The contact lens of claim 19 wherein the radius of said opposite curvature is between 1.3 millimeters and 1.9 millimeters.

21. The contact lens of claim 18 wherein said contact lens is adapted for the eye of an egg-laying hen, said transition being disposed radially outwardly from a center of the contact lens a distance selected to dispose said transition substantially over the fully retracted nictitating membrane.

22. The contact lens of claim 21 wherein the radius of said nominal curvature defines an angle of between about 33° and 39° at said transition with a line drawn through an origin of said first radius of curvature parallel to a diameter of the contact lens.

23. A contact lens for an eye of an animal having a nictitating membrane, said contact lens comprising:
  a curved central region;
  a peripheral region disposed about said central region and having a curvature opposite thereto;
  said peripheral region comprising an annular surface portion adapted to contact the eye tissue radially outwardly of a region on the eye at which the nictitating membrane joins the eye tissue; and
  said contact lens having a maximum thickness of 0.5 millimeters.

24. A contact lens for an eye of an animal having a nictitating membrane, said contact lens comprising:
  a. a central region having a curved interior surface; and
  b. a peripheral region disposed about and adjoining said central region and having a curved interior surface, said peripheral region supporting the contact lens on the eye so that the interior surface of said central region is spaced from the eye to provide a chamber for the nictitating membrane to move over the surface of the eye;
  c. the slope of the curvature of the interior surface of the central region being continuous with the slope of the curvature of the interior surface of said peripheral region at the junction between said central and peripheral regions so that said junction does not interfere with the movement of the nictitating membrane in said chamber.

25. A contact lens for an eye of an animal having a nictitating membrane, said contact lens having a curved exterior surface and comprising:
  a. a central region adapted to be disposed over and spaced from the cornea of the eye when the contact lens is in place in the eye to allow the nictitating membrane to move between the cornea and said central region;
  b. a peripheral region and disposed about and adjoining said central region; and
  c. said peripheral region having a first thickness and at least a portion of said central region having a second thickness greater than said first thickness, with no curvature discontinuities existing on the exterior surface of said contact lens.

26. The contact lens of claim 25 wherein said first thickness is between approximately 0.08 millimeters and 0.32 millimeters.

27. The contact lens of claim 25 wherein said first thickness is substantially 0.16 millimeters.

28. The contact lens of claim 25 wherein said second thickness is a maximum of 0.5 millimeters.

29. The contact lens of claim 25 wherein the thickness of a portion of said central region through which the animal sees varies in thickness in an amount selected to minimize vision distortion.

30. The contact lens of claim 29 wherein the interior and exterior surfaces are each substantially smooth and free from discontinuities.

31. A contact lens for the eye of an animal having a nictitating membrane, said contact lens comprising
- a central region through which the animal sees and which is adapted to be spaced from the eye to provide a chamber for the nictitating membrane, and
- a peripheral region disposed about said central region and bearing on the eye tissue to support the contact lens on the eye, said supporting peripheral region having a maximum thickness less than 0.19 mm.

* * * * *

UNITED STATES PATENT AND TRADEMARK OFFICE
CERTIFICATE OF CORRECTION

PATENT NO. : 4,955,711

DATED : September 11, 1990

INVENTOR(S) : Randall E. Wise, et al

It is certified that error appears in the above-identified patent and that said Letters Patent is hereby corrected as shown below:

Other Publications (page 2), In the citation of the article entitled "Monkeying' Around with Contacts", replace "pp. 23-25" with --23-25--.

Col. 3, line 24, replace "non dis-" with --non-dis--.

Col. 9, line 23, replace "Anq-" with --Ang- --.

Signed and Sealed this

Second Day of June, 1992

*Attest:*

DOUGLAS B. COMER

*Attesting Officer*     Acting Commissioner of Patents and Trademarks